Dec. 29, 1964   F. J. AGES   3,163,359
THERMOSTATIC VALVE
Filed May 28, 1962

INVENTOR.
FREDERIK J. AGES
BY
Alan M. Staubly
ATTORNEY

United States Patent Office 3,163,359
Patented Dec. 29, 1964

3,163,359
THERMOSTATIC VALVE
Frederik J. Ages, Rolling Hills Estates, Calif., assignor to Honeywell Inc., a corporation of Delaware
Filed May 28, 1962, Ser. No. 197,941
1 Claim. (Cl. 236—48)

This invention relates to thermostatic valves and, more particularly to a thermostatic, step opening and modulating gas valve subassembly adapted to be mounted on a single valve body or on a manifold valve body in combination with other valves.

Manufacturers of gas control valves are constantly striving to reduce the cost thereof and to make them more easily assembled and disassembled in the field so that it is unnecessary for the entire valve to be removed from a heating installation to either service the valve or to substitute one type of valve control for another.

It is one of the objects of this invention to provide a valve subassembly of the above mentioned type which is compact, contains a minimum of easily assembled parts and yet be of reliable and inexpensive construction.

Another object of the invention is to provide a valve of the above mentioned type wherein none of the moving parts of the valve and valve actuating mechanisms are fixedly secured within the housing therefor.

Figure 1:
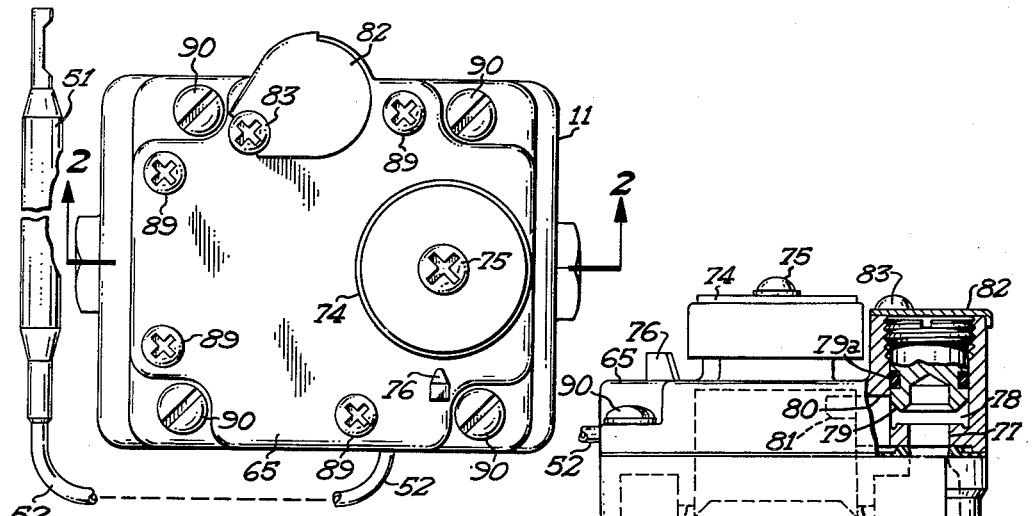
Figure 3:
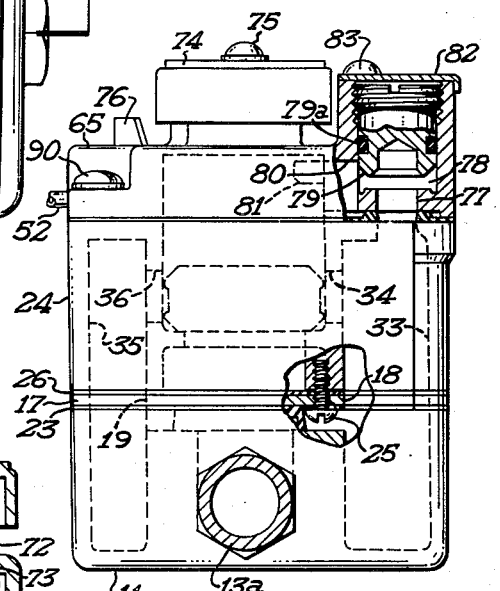
Figure 2:
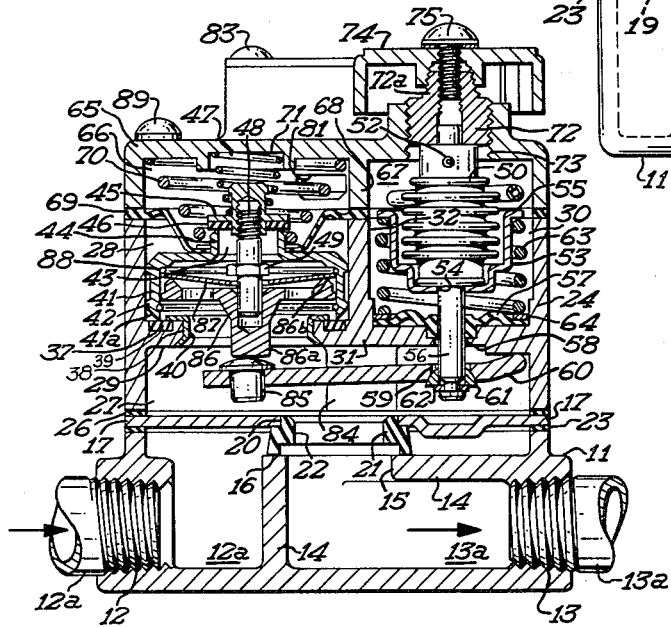

Other objects of the invention will become apparent upon reading the following detailed description of the invention in conjunction with the accompanying drawing wherein:

FIGURE 1 is a plan view of the invention showing the valve subassembly applied to a single valve body;

FIGURE 2 of the drawing is a vertical sectional view of the invention taken along line 2—2 of FIGURE 1; and FIGURE 3 is an end view of the invention showing portions thereof broken away.

As mentioned above, the valve subassembly about to be described is adapted to be mounted on a manifold valve body having a plurality of valve cavities and valve actuating mechanisms therein but, for the sake of simplicity, is illustrated as being applied to a single valve body. This body is designated by the reference numeral 11 and has a threaded inlet 12, a threaded outlet 13 and a partition wall 14 therebetween with a vertically extending aperture 15 terminating in an upper annular flat surface 16.

A base plate 17 has openings 18 and 19 therein which communicate with the inlet cavity in the valve body and has an opening 20 therein which is coaxial with the opening 15 in the valve body. A rubber collar having stepped inner and outer diameters, extends into the opening 20 at the upper end thereof and bears at the lower end thereof against the flat annular surface 16 to provide a gastight passageway 22 between the upper side of the plate 17 and the opening 15 leading to the outlet 13. A sealing gasket 23 is positioned between the plate 17 and the upper edge of the valve body 11 to provide a gastight seal therebetween around their peripheries.

The base plate 17 is secured to a housing 24 by means of a plurality of screws 25 extending upwardly through the base plate and into threaded bores in the underside of the housing 24 (see FIGURE 3). A sealing gasket 26 is positioned between the base plate and the lower periphery of the housing 24 to provide a gastight seal therebetween.

The housing 24 has an upwardly extending elongated recess 27 in the bottom thereof. A downwardly extending recess 28 terminates short of the recess 27 to provide a partition wall 29 therebetween, while another downwardly extending recess 30 terminates short of the recess 27 to provide a partition wall 31 between the recess 30 and recess 27 and a partition wall 32 between the recess 30 and the recess 28. A vertically extending passage-way 33 leads from the opening 18 in the base plate 17 to the top surface of the housing 24 in spaced relationship with respect to the recesses 28 and 30. A transversely extending passageway 34 leads from the passageway 33 into a recess 28. A second vertically extending passageway 35 extends from the opening 19 in the base plate through a point short of the top of the housing 24 and in spaced relationship with the recesses 28 and 30 and on the other side thereof from the vertical passageway 33, and has a transversely extending passageway 36 leading therefrom to the interior of the recess 28.

Secured in an annular groove 37 in the upper surface of the partition wall 29 and around a vertical bore or opening 38 through the partition wall, is a rubber washer 39. It is held in position in the annular groove by means of a hollow rivet 40 having an upper flange which overlies the inner periphery of the washer and a lower outwardly beveled flange that has been forced outwardly against a beveled surface at the lower end of the opening 38. It is thus seen that when so held, the washer 39 forms a soft valve seat.

Cooperating with the valve seat 39 is an inverted cup-shaped valve 41 inwardly beveled at its lower edge 41a to provide an annular line contact with the valve seat 39. Small round bosses or projections 42 spaced around the upper and lower outer periphery of the valve 41, provide low friction contact with the inner surface of the recess 28 to permit vertical sliding of the valve in the recess and to permit free flow of gas around the valve from the passageways 34 and 36 to the opening through the hollow rivet and, thus, to the opening 22 and outlet 13 when the valve is off of its seat 39. The valve has a coaxial opening 43 in the top thereof in the form of an upwardly extending sleeve portion 44 that terminates at its upper edge in a knife-edge valve seat. Cooperating with the valve seat on sleeve 44 is a disk valve 45 having a rubber washer 46 thereon that is adapted to engage the valve seat. A coil compression spring 47 normally biases the valve 45 into engagement with the valve seat. A valve stem 48 is threaded into a threaded socket in the valve 45 and extends downwardly through the valve 41. An abutment shoulder 49 is provided intermediate the ends of the valve stem 48 to be engaged by a valve actuating mechanism to be presently described.

Mounted in the recess 30, is the bellows 50 of a bulb and bellows thermostatic power means for actuating the valves. It is connected to a temperature responsive fluid filled bulb 51 through a capillary tube 52. The lower end of the bellows 50 rests in the bottom of a cup-shaped abutment member 53 having an aperture 54 through the bottom thereof and an outwardly extending annular flange 55 around its upper periphery. An actuating stem 56 extends from the bottom of the bellows 50 through the opening 54 in the abutment member 53, through an opening in a sealing diaphragm 57, through an opening 58 in the partition wall 31 and through an opening 59 in a floating valve actuating lever 60. An apertured semispherical abutment shoulder 61 surrounds the lower end of the stem 56 and is retained thereon by means of a split washer 62 positioned below the abutment member and resting in the annular groove. The outer periphery of the sealing diaphragm 57 is forced against the partition wall 31 by means of a coiled compression spring 63 extending between the annular flange 55 and a clamping washer 64 overlying the periphery of the sealing diaphragm 57.

Overlying the recesses 28 and 30 and passageway 33, is a cover member 65 having two upwardly extending recesses 66 and 67 providing a partition wall 68 therebetween. The periphery of the recess 66 engages the upper periphery of a sealing diaphragm 69 which rests on the upper periphery of the recess 28 in the housing 24 while a spiral compression spring 70 bears at its upper end against the upper end of the recess 66 and at its lower end against a clamping washer surrounding the sleeve portion 44 of valve 41 and bearing downwardly against the upper surface of the inner periphery of the sealing diaphragm 69 to provide a gastight seal between the inner periphery of the diaphragm 69 and the valve 41. The upper end of the previously mentioned compression spring 47 rests in a socket 71 in the top wall of the recess 66, coaxial with the spring 70. It is thus seen that the spring 47 reacts against the cover 65 to bias the small valve against its valve seat while the larger spring 70 reacts against the cover member to seal the diaphragm against the larger valve and to bias the larger valve against its valve seat.

The upper end of the bellows 50 is swivelly mounted in an adjusting screw 72 screw threaded into a threaded bore 73 extending through the top wall of the recess 67. A manually adjustable control knob 74 is threaded onto a threaded projection 72a of the adjustment screw and is locked thereon by means of a bolt 75 extending through the knob and threaded into an adjustment screw 72. Rotation of the control knob 74 to position the indicia on the top of the knob selectively opposite the pointer 76, enables the operator to vary the control point at which the thermostatic bulb and bellows means will actuate the valves.

A passageway 77 in the cover 65 extends from the upper end of passageway 33 to a valve chamber 78. This valve chamber is threaded at its upper end and has adjustably threaded therein a manually adjustable valve 79 which is adapted to cooperate with the upper end of the passageway 77 to control the rate of flow of fluid through the passageway 77 to a transversely extending passageway 80 that terminates in the recess 66 through an opening 81 in the side wall thereof. A cover plate 82 is pivotally mounted on the top of the valve chamber 78 by means of a screw 83. By swinging the cover 82 from over the adjustable valve 79, it is possible to change the rate of flow from the inlet to the recess or chamber above the small valve 45.

The actuating mechanism between the bellows and the two valves includes the above mentioned lever 60 which is pivoted at one end on the under surface of the partition wall 31 and which is guided in its upward and downward movement by the actuating stem 56 between ribs 84 formed on the side walls of the recess 27. The other end of the lever 60 has a headed bearing pin 85 extending through an opening in the lever and bears against the downwardly extending stem 86a of a movable fulcrum member 86. The fulcrum member 86 has an annular knife-edge fulcrum 86b which is vertically slidable in the cup-shaped valve member 41 and bears against a snap disk 87. The snap disk has inwardly extending radial arms that are adapted to engage the underside of the abutment member 49 on the valve stem 48 when the annular fulcrum member 86b is moved upwardly by the lever 60, the outer periphery of the snap disk being pivoted on a pivot ring 88 in the valve head 41 and the spring 70 being sufficiently strong to hold the valve 41 against its seat until the snap disk is actuated to lift the valve 45 off of its seat. The lower end of the valve stem 48 is guided by the fulcrum member 86 by being inserted into a bore therein.

It is to be noted that the only fastening means for holding the various elements of the valve assembly in their assembled relationship are the screws 89 for holding the cover 65 on the housing 24, the screws 90 for holding the housing 24 on the valve body 11, and the split washer 62 for holding the lever 60 on the actuating stem 56.

*Operation*

Assuming that the valve as illustrated in the drawing is installed in a heating system with the inlet 12 connected to a source of gas through a pipe 12a and the outlet 13 is connected to a main burner of a furnace through pipe 13a, the elements of the valve would be in the position showing that the temperature of the room in which the bulb 51 is positioned, is above the control point of the valve. That is, the bellows 50 is expanded sufficiently to take the pressure off of the lever 60 so as to permit the springs 70 and 47 to hold the main large valve 41 and the smaller valve 45 against their valve seats.

Now assuming that the temperature surrounding bulb 51 should drop sufficiently to cause the fluid in the bulb 51 and bellows 50 to contract, the springs 63 will bias the stem 56 upwardly and cause the lever 60 to pivot about the right-hand end of the lever 60 to lift the movable fulcrum member 86. When the fulcrum member is moved sufficiently far to cause the snap disk to snap over center and the inwardly extending arms thereon to engage the abutment 49 to lift the valve 45 off of the valve seat 44, gas will flow through the inlet 12, through chamber 12a, through passageway 33, through chamber 78, through passageway 80 in opening 81 into chamber or recess 66 through the sleeve 43, through and around movable fulcrum member 86 to recess 27 through sealing washer 22 through outlet 13 and pipe 13a to the main burner. Due to the fact that the amount of gas flow through these passageways is controlled to a minimum flow by the adjustable valve 79, only the necessary amount of gas to assure proper ignition of the main burner is delivered to the main burner. Heat will be generated by the burner at this gas flow rate until either the temperature rises around the bulb 51 or drops lower. If the temperature rises, the reverse action of that described above will take place in the elements to close the valve 45 to cut off the gas flow.

If, on the other hand, the temperature around bulb 51 should drop an additional amount, further upward movement of the movable fulcrum will cause the lifting of the main valve 41 off of its seat, the greater the lowering of the temperature around the bulb 51, the greater the lifting of the valve 41, to provide a modulating regulation of the valve 41 to meet the demand. With the lifting of the valve 41, additional gas will flow through passageway 34 from passageway 33 and passageway 35–36, to provide a parallel additional gas flow from passageway 33 to the outlet 13.

As modifications may be made in the invention without departing from the spirit thereof, the scope of the invention should be determined from the appended claim.

I claim as my invention:

A thermostatic valve subassembly comprising a housing adapted to be mounted on a valve body having an inlet and an outlet and an apertured wall therebetween, said housing having a first recess in one side thereof adapted to communicate with the aperture in the wall of the valve body and second and third recesses in the opposite side thereof forming partition walls therebetween, a valve opening through the wall between the first and second recesses, a first valve seat in said second recess around said valve opening, a first cup-shaped valve slidable in said second recess and guidable by the wall of said recess and cooperable with said valve seat to control fluid flow therethrough, said first valve having a coaxial opening therein and formed to provide a second valve seat, sealing means between said first valve and the side walls of said second recess, a second valve cooperable with said second valve seat, first means biasing said first valve against said first valve seat, second means biasing said second valve against said second valve seat, motion transmitting means that is so arranged with respect to said first and second valves that it will first open said second valve and then said first valve as it is moved in a valve opening direction, a floating lever in said first recess and having a first portion positioned to actuate said motion transmitting means and a second portion positioned in abutting engagement with said housing as a pivot, power means located in said third recess and having an actuating stem in engagement with a third portion of said lever for actuating said lever, a single cover member secured to said housing over said second valve and bearing against said first and second biasing means and one end of said power means, a first passageway in said housing extending from said second recess and adapted to communicate with the inlet of the valve body, and a second passageway extending from the interior of said cover member over said second valve and adapted to communicate with said inlet.

References Cited in the file of this patent

UNITED STATES PATENTS

| | | |
|---|---|---|
| 801,458 | Huxley | Oct. 10, 1905 |
| 2,743,871 | Heiser et al. | May 1, 1956 |
| 2,794,600 | Ehlke | June 4, 1957 |
| 2,831,504 | Coffey | Apr. 22, 1958 |
| 2,868,457 | Currie et al. | Jan. 13, 1959 |
| 2,889,990 | Loveland et al. | June 9, 1959 |